J. Brown,
Furniture Caster.
N°76,885. Patented Apr 21, 1868.
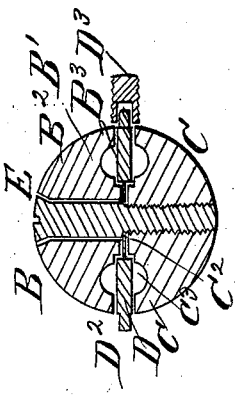
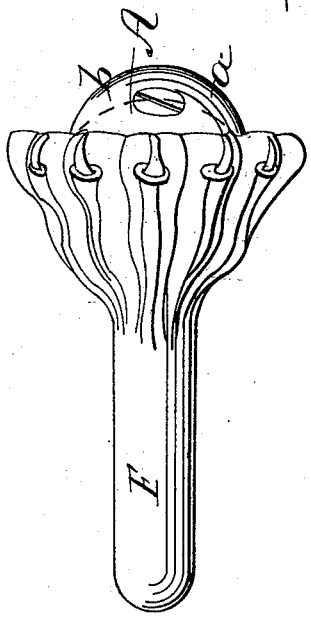
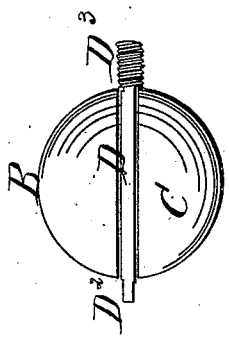
Witnesses:
George M. Weaver
John G. Crocker
Inventor:
John Brown

United States Patent Office.

JOHN BROWN, OF UTICA, NEW YORK.

Letters Patent No. 76,885, dated April 21, 1868.

---

IMPROVED CASTER FOR FURNITURE.

---

*The Schedule referred to in these Letters Patent and making part of the same.*

---

TO ALL WHOM IT MAY CONCERN:

Be it known that I, JOHN BROWN, of Utica, New York, have invented a new and improved Caster for Furniture and the like purposes; and I do hereby declare that the following is a full, clear, and exact description of my said invention, and of the mode of operation of the same, reference being had to the accompanying drawings, making a part of this specification, in which—

Figure 1 is a perspective view of the caster,

Figure 2 a perspective view of the roller, and

Figure 3 a sectional view of the roller in the line $a\,b$, fig. 1.

A is the roller; B and C are the halves thereof; $B^1$ and $C^1$, where portions of the faces of B and C are removed; $B^2$ and $C^2$ are countersinks in the faces of the hemispheres; D is a circular plate; $D^1$, a circular opening in the centre; $D^2$ and $D^3$ are arms to the plate, and forming bearings for the roller; E is a screw or rivet to hold the parts together; and F is the standard.

I use a ball or sphere for my roller, composed of parts so arranged that motion in any direction may be obtained.

The roller is composed of two hemispheres, B and C. A part of the face of each is cut away at $B^1$ and $C^1$, as seen in fig. 3, leaving the centre of each projecting above the other parts. Between this part and the circumference, the faces may be countersunk or grooved to reduce the bearing-surfaces. The circular plate D is slightly less in diameter than the hemispheres, with an opening in the centre, $D^1$, corresponding in size and position with the centres of the faces of the hemispheres. The thickness of the plate is such that when the parts are put together the whole will form a true sphere. To the edges of the plate D are attached two arms, $D^2$ and $D^3$. These arms form the bearings of the roller in the standard. The parts of the roller are held together by the screw E, or a rivet, running through the centre of each. The standard may be at one side of the roller, as with the common caster, but this is not necessary.

The operation will be obvious. When the motion is forward or back, the roller turns at right angles to its axis $D^2$ and $D^3$. When the motion is sideways, the plate D is vertical, and the hemispheres alone turn round the rivet as their axis. Thus motion is obtained sideways as readily as forward and back. This can only be done, with the ordinary caster, after it has been turned about, and if the furniture is heavy, the edge of the wheel generally first tears the carpet; and the ordinary ball-casters work at all times imperfectly.

Having thus described my invention, what I claim as new therein, and desire to secure by Letters Patent, is—

Forming the roller of the parts B and C and the plate D, substantially as described and for the uses and purposes mentioned.

JOHN BROWN.

Witnesses:
JOHN G. CROCKER,
GEORGE M. WEAVER.